(12) United States Patent
Shi

(10) Patent No.: US 8,457,791 B2
(45) Date of Patent: Jun. 4, 2013

(54) METHOD FOR DYNAMICALLY CONTROLLING A ROBOTIC ARM

(75) Inventor: Jianying Shi, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1001 days.

(21) Appl. No.: 12/400,883

(22) Filed: Mar. 10, 2009

(65) Prior Publication Data

US 2010/0234994 A1    Sep. 16, 2010

(51) Int. Cl.
*G05B 15/00* (2006.01)
*G05B 19/00* (2006.01)

(52) U.S. Cl.
USPC .............................. 700/258; 700/1; 700/245

(58) Field of Classification Search
USPC ............... 700/245, 258; 901/30, 40, 41, 47, 901/9; 414/217, 225.01, 729, 737, 744.2, 414/937, 940, 941; 29/434, 464, 559; 269/21, 269/281, 55, 58
See application file for complete search history.

(56) References Cited

U.S. PATENT DOCUMENTS

| | | | | |
|---|---|---|---|---|
| 4,575,304 A | * | 3/1986 | Nakagawa et al. | 414/730 |
| 4,675,502 A | * | 6/1987 | Haefner et al. | 219/124.34 |
| 4,831,549 A | * | 5/1989 | Red et al. | 700/254 |
| 4,833,381 A | * | 5/1989 | Taft et al. | 318/577 |
| 5,276,777 A | * | 1/1994 | Hara | 700/252 |
| 5,523,663 A | * | 6/1996 | Tsuge et al. | 318/568.16 |
| 5,572,103 A | * | 11/1996 | Terada | 318/568.13 |
| 5,579,444 A | * | 11/1996 | Dalziel et al. | 700/259 |
| 6,078,846 A | * | 6/2000 | Greer et al. | 700/174 |
| 6,205,949 B1 | * | 3/2001 | van den Berg | 119/14.02 |
| 6,466,841 B2 | * | 10/2002 | DiStasio et al. | 700/213 |
| 6,591,161 B2 | * | 7/2003 | Yoo et al. | 700/218 |
| 6,615,112 B1 | * | 9/2003 | Roos | 700/254 |
| 7,264,436 B2 | * | 9/2007 | Tillmann | 414/744.5 |
| 7,298,385 B2 | * | 11/2007 | Kazi et al. | 345/633 |
| 7,324,873 B2 | * | 1/2008 | Nagatsuka et al. | 700/252 |
| 7,340,323 B2 | * | 3/2008 | Zhang et al. | 700/260 |
| 7,498,542 B2 | * | 3/2009 | Pan et al. | 219/124.1 |
| 7,571,025 B2 | * | 8/2009 | Bischoff | 700/248 |
| 2002/0013675 A1 | * | 1/2002 | Knoll et al. | 702/150 |
| 2003/0048459 A1 | * | 3/2003 | Gooch | 356/620 |
| 2003/0090682 A1 | * | 5/2003 | Gooch et al. | 356/620 |
| 2004/0093119 A1 | * | 5/2004 | Gunnarsson et al. | 700/245 |
| 2004/0189631 A1 | * | 9/2004 | Kazi et al. | 345/418 |
| 2004/0257021 A1 | * | 12/2004 | Chang et al. | 318/568.21 |
| 2005/0065653 A1 | * | 3/2005 | Ban et al. | 700/245 |
| 2005/0107919 A1 | * | 5/2005 | Watanabe et al. | 700/245 |
| 2005/0113971 A1 | * | 5/2005 | Zhang et al. | 700/245 |
| 2005/0131582 A1 | * | 6/2005 | Kazi et al. | 700/259 |
| 2005/0273202 A1 | * | 12/2005 | Bischoff | 700/263 |
| 2006/0178775 A1 | * | 8/2006 | Zhang et al. | 700/245 |
| 2007/0073444 A1 | * | 3/2007 | Kobayashi et al. | 700/264 |
| 2007/0083291 A1 | * | 4/2007 | Nagatsuka et al. | 700/252 |

(Continued)

OTHER PUBLICATIONS

Malleable Workpiece—NPL.*

*Primary Examiner* — Ian Jen

(57) ABSTRACT

A method for maneuvering an articulable robotic arm includes monitoring a position of a dynamically moveable workpiece. Individual motion segments are iteratively executed to control the articulable robotic arm to position the end-of-arm tool contiguous to the workpiece and corresponding to an initial position of the end-of-arm tool, an initial position of the workpiece and an iteratively determined updated position of the workpiece.

12 Claims, 3 Drawing Sheets

U.S. PATENT DOCUMENTS

| | | | |
|---|---|---|---|
| 2007/0213874 A1* | 9/2007 | Oumi et al. | 700/245 |
| 2007/0293987 A1* | 12/2007 | Yamada et al. | 700/245 |
| 2008/0089468 A1* | 4/2008 | Heigl et al. | 378/20 |
| 2008/0161964 A1* | 7/2008 | Irie et al. | 700/166 |
| 2008/0216552 A1* | 9/2008 | Ibach et al. | 73/1.01 |
| 2008/0249659 A1* | 10/2008 | Ueyama | 700/245 |
| 2009/0010285 A1* | 1/2009 | Dubois et al. | 372/3 |
| 2009/0157226 A1* | 6/2009 | de Smet | 700/254 |

\* cited by examiner

METHOD FOR DYNAMICALLY CONTROLLING A ROBOTIC ARM

TECHNICAL FIELD

This disclosure is related to dynamically controlling a robotic arm.

BACKGROUND

Known robotic apparatuses having attached end-of-arm tools are used to manipulate workpieces. Known end-of-arm tools can be maneuvered to engage a workpiece at a known location, act on the workpiece, transport the workpiece to a new location, and orient and engage the workpiece with other pieces and then release the workpiece. Applications of robotic apparatuses with end-of-arm devices include, e.g., material handling, manufacturing, packaging, and testing. Known robotic apparatuses have reference coordinate frames, e.g., a spatial three-dimensional coordinate system, and can be controlled to place the end-of-arm tool at a fixed position in the reference coordinate frame. Known robotic apparatuses use a vision sensor and a vision statement inserted in a computer program to command the robotic apparatus to move to a predetermined position in the reference coordinate frame, including applying a visual offset from the vision sensor in a static manner to command and correct maneuvering of the robotic apparatus. In such systems there is an initial or start position of the end-of-arm tool, and a nominal goal position of the end-of-arm tool. Signal input from the vision sensor is used to locate the workpiece and define a vision-based offset to the nominal goal position of the end-of-arm tool. The robotic apparatus is commanded to move the end-of-arm tool to a fixed position defined by the nominal goal position corrected with the vision-based offset.

Known workpieces can be pliable or malleable, and dynamically moveable, resulting in changes in location of elements of the workpiece during the period of time when the robotic apparatus moves the end-of-arm tool. A change in location of an element of the workpiece can cause a mismatch between a final position of the end-of-arm tool and the nominal goal position of the workpiece.

SUMMARY

Maneuvering an articulable robotic arm having an end-of-arm tool includes monitoring a position of a workpiece that is dynamically moveable, determining an initial position of the workpiece, determining an initial position of the end-of-arm tool, iteratively determining an updated position of the workpiece corresponding to the monitored position of the workpiece, and iteratively executing individual motion segments to control the articulable robotic arm to position the end-of-arm tool contiguous to the workpiece based upon the initial position of the end-of-arm tool, the initial position of the workpiece and the iteratively determined updated position of the workpiece.

BRIEF DESCRIPTION OF THE DRAWINGS

One or more embodiments will now be described, by way of example, with reference to the accompanying drawings, in which.

DETAILED DESCRIPTION

Figure 1:
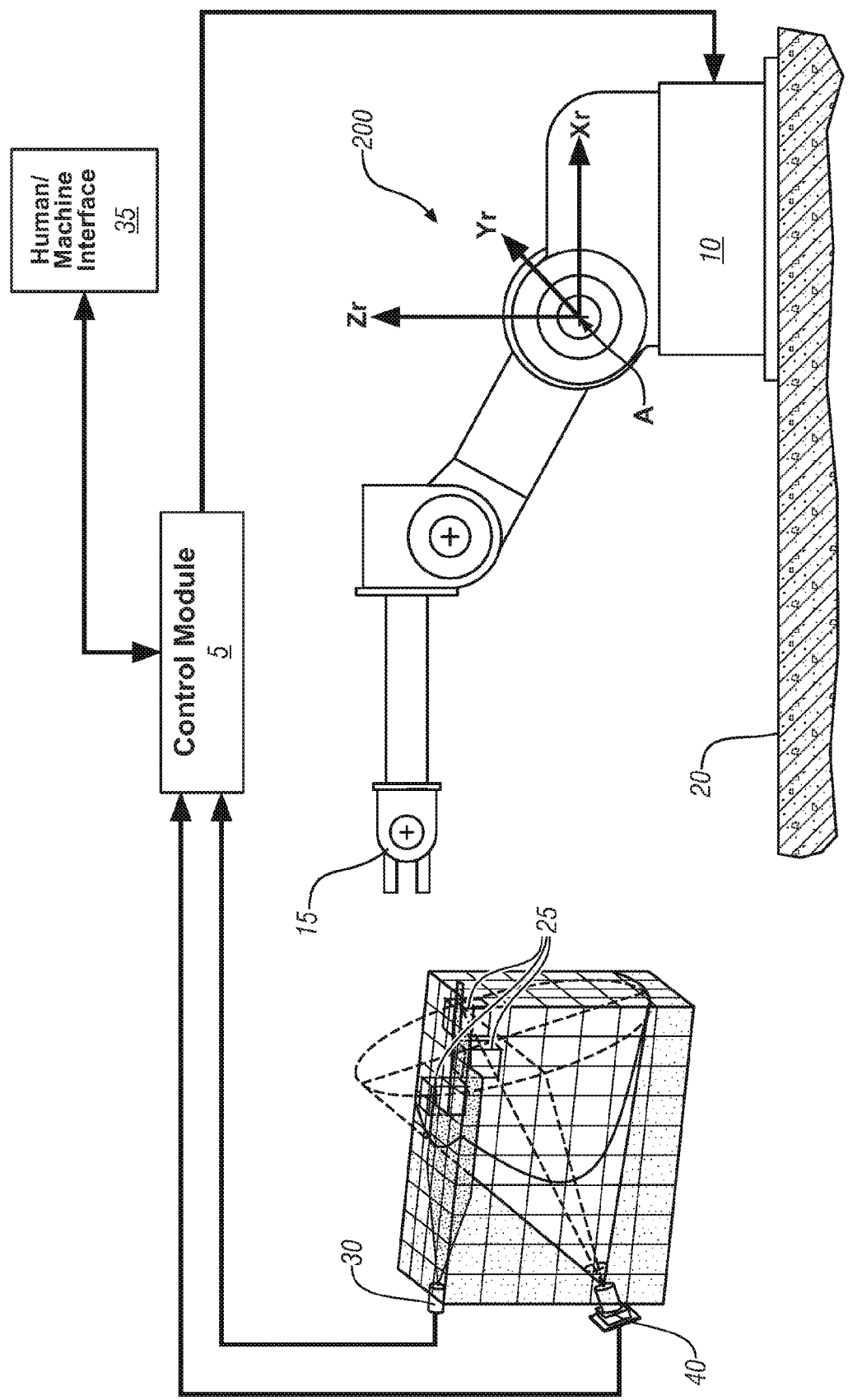
FIG. 1 is a schematic diagram of a system including a maneuverable robotic arm, in accordance with the present disclosure.

Referring now to the drawings, wherein the showings are for the purpose of illustrating certain exemplary embodiments only and not for the purpose of limiting the same, FIG. 1 schematically illustrates an articulable robotic arm 10 mounted on a base 20 having an end-of-arm-tool 15 ('EOAT). A control module 5 is signally connected to a plurality of locating sensing devices 30, 40 and operatively connected to the robotic arm 10. A human-machine interface device 35, e.g., a computer terminal is signally and operatively connected to the control module 5, and is used by an operator to setup and operate the robotic arm. The control module 5 can control the robotic arm 10 to place the EOAT 15 at a predetermined location and configuration. The EOAT 15 preferably attaches to a free end of the articulable robotic arm 10, or another material handling device (not shown). The robotic arm 10 is a programmable device operative to linearly and rotationally translate position of the EOAT 15 in space to the preferred location and configuration. A spatial three-dimensional coordinate system 200 is shown having a point of origin A and including an x-axis, a y-axis and a z-axis, and includes positions that can be defined relative to the x-axis (Xr), the y-axis (Yr), and the z-axis (Zr).

The position of the EOAT 15 is defined in terms of linear and rotational positions relative to the x-axis (Xr), the y-axis (Yr), and the z-axis (Zr) of the spatial three-dimensional coordinate system 200. The point of origin A is preferably referenced to and defined at an identifiable physical location on the robotic arm 10.

The locating sensing devices 30, 40 can be oriented to identify and detect position of a workpiece 25 and periodically monitor its position. Each of the locating sensing devices 30, 40 is preferably setup and calibrated to identify the workpiece 25 and locate the position of the workpiece 25 relative to the spatial three-dimensional coordinate system 200 when activated. In one embodiment, one of the locating sensing devices 30, 40 is mechanically fixed to the robotic arm 10 and moves therewith.

Exemplary locating sensing devices 30, 40 can include low-resolution, wide-range devices that are used to dynamically maneuver the robotic arm 10 in space. Low resolution locating sensing devices include time-of-flight-based 3D laser rangefinders and flash LIDAR-based 3D image devices. Exemplary locating sensing devices 30, 40 can include high resolution devices having sufficient resolution to locate a position of the workpiece 25 with a narrow field-of-view and a focused sensing area. High resolution devices include high resolution image-based vision systems and triangulation-based short-range, high-precision 3D laser scanners. The locating sensing devices 30, 40 generate signals indicating a present position of the workpiece 25 that are transformed to the spatial three-dimensional coordinate system 200 and are input to the control module 5.

The control module 5 executes algorithmic code stored therein to control the robotic arm 10. The control module 5 is preferably a general-purpose digital computer comprising a microprocessor or central processing unit, storage mediums comprising non-volatile memory including read only memory and electrically programmable read only memory, random access memory, a high speed clock, analog-to-digital and digital-to-analog circuitry, and input/output circuitry and devices and appropriate signal conditioning and buffer circuitry. The control module 5 has a set of control algorithms, comprising resident program instructions and calibrations stored in the non-volatile memory and executed to provide the respective functions described herein. Algorithms are executed by the central processing unit to monitor the signals from the locating sensing devices 30, 40 indicating the present position of the workpiece 25 and execute control routines to control actuators (not shown) of the robotic arm 10 using preset calibrations. The algorithms are preferably executed at regular intervals, for example every 10 milliseconds during ongoing operation.

The workpiece 25 can comprise a device that includes flexible or malleable elements. Examples of flexible or malleable workpieces 25 illustrative of the concept include a wiring harness and a fascia element for a front end assembly of a vehicle. Alternatively, the workpiece 25 can comprise a device that is dynamically moving, e.g., on a conveying device.

Figure 2:
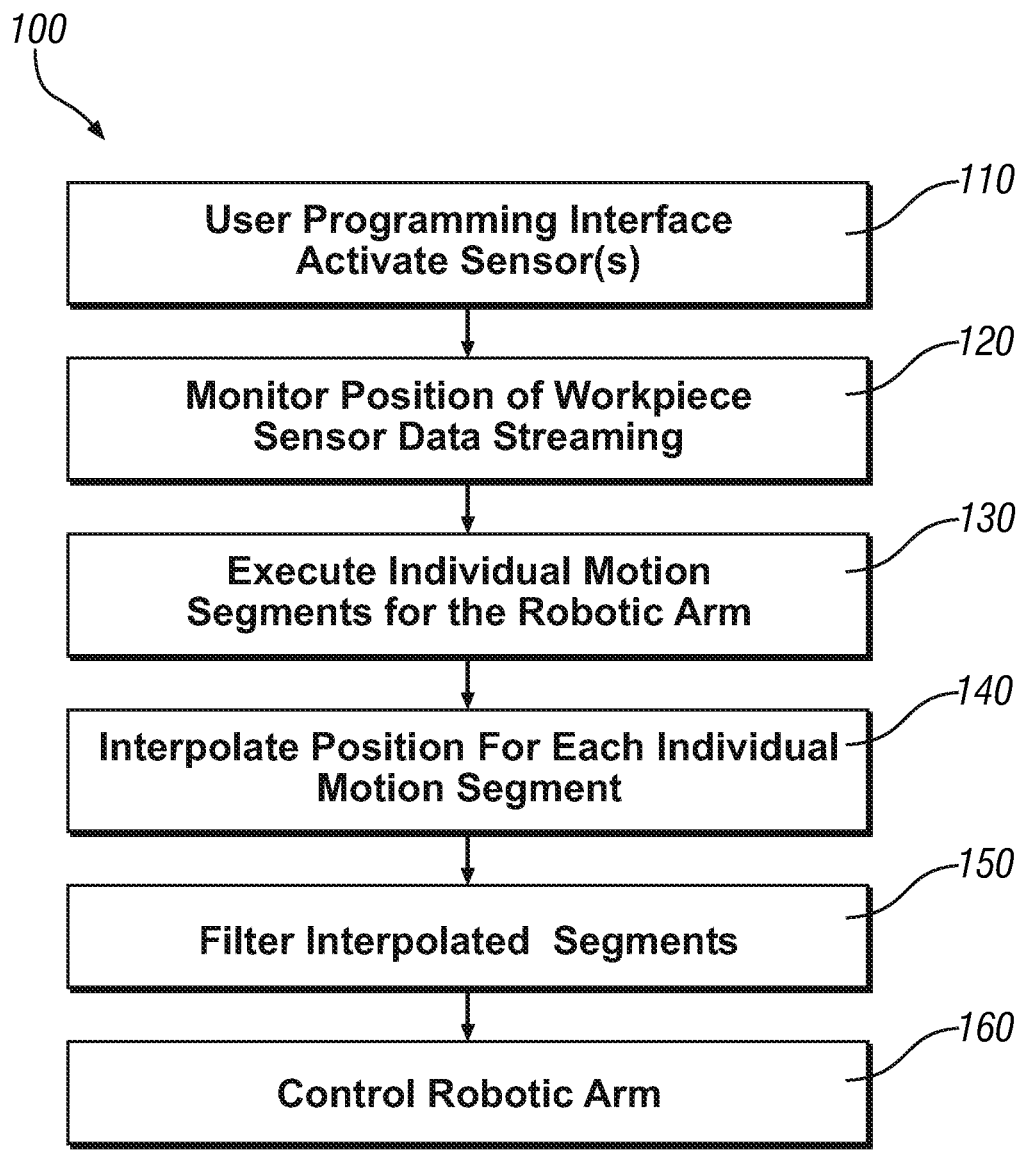
FIG. 2 is a flowchart detailing iteratively maneuvering the robotic arm, in accordance with the present disclosure.

FIG. 2 shows a method (100) in flowchart form for maneuvering the articulable robotic arm 10 with the EOAT 15 to engage the workpiece 25. The elements of the method (100) are illustrated as discrete elements for ease of description; however, it should be recognized that the functions performed by these elements may be combined in one or more devices, e.g., implemented in software, hardware, and/or application-specific integrated circuitry (ASIC). Preferably a user programming interface operation is initially executed (110) to identify a workpiece 25 and define a task for the robotic arm 10. This includes determining a first position of the workpiece 25 and determining a first position of the EOAT 15 of the articulable robotic arm 10. The positions are defined relative to the spatial three-dimensional coordinate system 200. The position of the workpiece 25 is periodically and ongoingly monitored using the signal inputs from the plurality of locating sensing devices 30, 40. An iterative process is executed, whereby each of the plurality of locating sensing devices 30, 40 periodically generates a sensor data stream descriptive of an updated position of the workpiece 25 (120). The control module 5 executes code to move the robotic arm 10 such that the EOAT 15 engages the workpiece 25 at the updated position of the workpiece 25, the updated position having been iteratively determined based upon the periodically generated data stream. The robotic arm 10 is moved preferably by iteratively executing individual robotic motion segments (130). This includes iteratively determining a correction vector relative to the first position of the workpiece 25 based upon the monitored position of the workpiece 25 using the sensor data stream from the plurality of locating sensing devices 30, 40. Individual motion segments include motion of the robotic arm 10 in a single direction as controlled by individual position control devices (not shown) of the robotic arm 10 including an extension in one of the x-, y- and z-axes. Individual motion segments can include rotation of the robotic arm 10 and the EOAT 15 about one of the x-, y- and z-axes.

The control module 5 executes code to execute local motion interpolation for the robotic arm 10 based upon the position of the workpiece 25 during each individual motion segment of the robotic arm (140), including filtering the interpolated segments (150). Individual control elements of the robotic arm 10, e.g., electro-mechanical servo devices (not shown) are controlled to maneuver the EOAT 15 to the preferred position and configured to be contiguous to and able to engage the workpiece 25 using control schemes during each of the individual motion segments, including using PID controls in one embodiment (160). The robotic arm 10 is moved and positioned at the preferred position to engage the workpiece 25 at its updated position using a control scheme such as a PID feedback control loop. In implementing the control scheme for the robotic arm 10, a first trajectory 210 is defined comprising a difference between the initial position of the EOAT 15 and an initial position of the workpiece 25. The first trajectory is segmented into small time increments that are driven by an iteratively executed position control law to move the robotic arm 10 along a first trajectory 210 as shown in FIG. 3.

Figure 3:
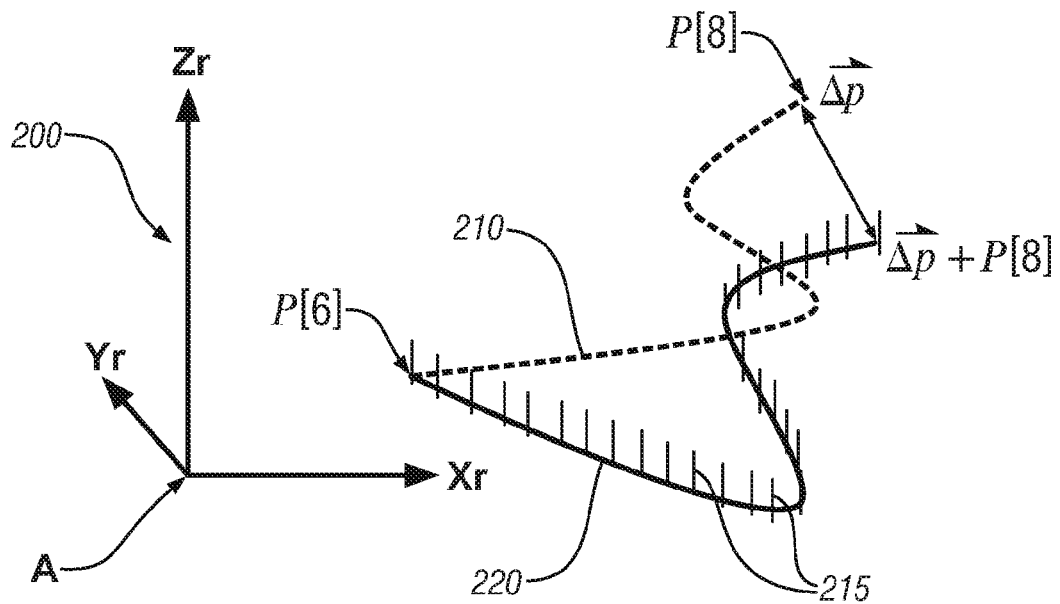
FIGS. 3 and 4 are graphical depictions of movements of the robotic arm, in accordance with the present disclosure.
Figure 4:
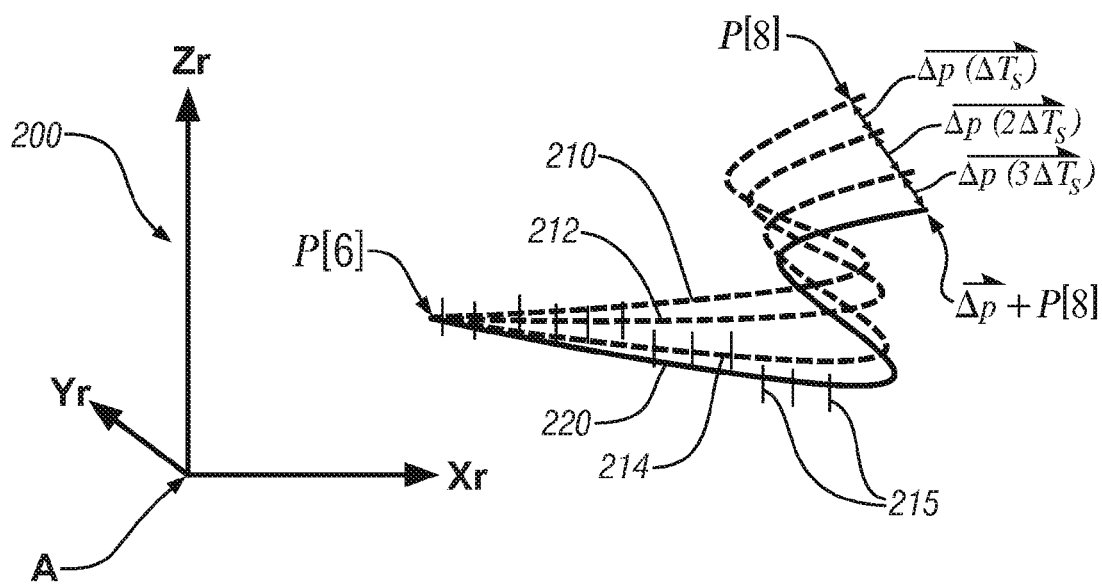

FIGS. 3 and 4 graphically show additional details for executing individual motion segments (130) including sensor data streaming to track position of the workpiece 25 (120) and interpolating position of the EOAT 15 during individual motion segments of the robotic arm 10 (140). FIG. 3 graphically shows an initial position of the EOAT 15 (P[6]), an initial position of the workpiece 25 (P[8]), a correction vector ($\vec{\Delta p}$), and an updated position of the workpiece 25 ($\vec{\Delta p}$+P[8]), all relative to the spatial three-dimensional coordinate system 200. The first trajectory 210 leading to the initial position of the workpiece 25 and a second, corrected trajectory 220 leading to the updated position of the workpiece 25, respectively, are shown. The updated position of the workpiece 25 is defined as the position in the spatial three-dimensional coordinate system 200 whereat the EOAT 15 is contiguous to and thus operable to engage the moveable workpiece 25 at its present position at the present point in time. The first trajectory 210 and the second trajectory 220 are shown relative to the spatial three-dimensional coordinate system 200 starting at the initial position of the EOAT 15. The second trajectory 220 includes a plurality of time-based segments (215) having an elapsed time period of $\vec{\Delta T_s}$ seconds. FIG. 4 graphically shows details of local motion interpolation to control the position of the EOAT 15 based upon the initial position of the workpiece 25 (P[8]) at time t=0 and the updated position of the workpiece 25. The initial position of the EOAT 15 (P[6]) is shown. A plurality of correction vectors $\vec{\Delta p}(t)$ is shown. The first trajectory 210 leading to the initial position of the workpiece 25 and a plurality of intermediate trajectories 212, 214 leading to iteratively determined intermediate positions of the workpiece 25 are shown, based upon the correction vectors $\vec{\Delta p}(t)$ and the final trajectory 220 leading to the final position of the workpiece 25.

Referring again to FIG. 2 and with continued reference to FIGS. 3 and 4, when the locating sensing devices 30, 40 are activated (110), signal outputs from the locating sensing devices 30, 40 are generated at each time period of $\vec{\Delta T_s}$ seconds to monitor the workpiece 25. The signal outputs are communicated to the control module 5 comprising sensor data streams $\overline{\Delta p(\Delta T_s)}$, $\overline{\Delta p(2\Delta T_s)}$, $\overline{\Delta p(3\Delta T_s)}$... $\overline{\Delta p(k\Delta T_s)}$ that represent dynamically updated positions of the workpiece 25, wherein k is a numeric integer value representing a total number of iterations to achieve the final position of the workpiece 25. This is shown in FIG. 4. The sensor data streams can comprise periodically updated vectors corresponding to the intermediate positions of the workpiece 25 that have been updated from the previous time period. The dynamically updated position of the workpiece 25 is P[8]+$\vec{\Delta p}(t)$, with $\vec{\Delta p}(t)$ comprising the updated correction vector based upon the sensor data streams from the locating sensing devices 30, 40.

FIGS. 3 and 4 each show the EOAT 15 at start position P[6] at time t=0, and the local motion interpolation is clocked at the elapsed time period of $\overrightarrow{\Delta T_{robot}}$ for an interpolated local motion command to the robotic arm 10 using a position control law.

At elapsed time t=$\overrightarrow{\Delta T_s}$, the control module 5 receives a sensor data stream from the locating sensing devices 30, 40 with an updated position comprising $\overrightarrow{\Delta p(\Delta T_s)}$ for the workpiece 25. At the next interpolation period, t=ceiling($\overrightarrow{\Delta T_s}/\overrightarrow{\Delta T_{robot}}$)* $\overrightarrow{\Delta T_{robot}}$, the sensor correction $\overrightarrow{\Delta p(\Delta T_s)}$ is used to update the initial position P[8] of the workpiece 25. The control module 5 monitors and receives the inputs from the locating sensing devices 30, 40 at the periodic time interval n*$\overrightarrow{\Delta T_s}$ and applies the present position at the next interpolation period ceiling (n*$\overrightarrow{\Delta T_s}/\overrightarrow{\Delta T_{robot}}$)*$\overrightarrow{\Delta T_{robot}}$ for n=1 through k. The updated position of the workpiece 25 P[8]+$\overrightarrow{\Delta p(t)}$=$\overrightarrow{p(t)_{new}}$ is set forth below.

$$\overrightarrow{p(t)_{new}} = \frac{(\overrightarrow{P[8]} + \overrightarrow{\Delta p(\Delta T_s)}) - \overrightarrow{P[6]}}{\overrightarrow{P[8]} - \overrightarrow{P[6]}} \cdot \overrightarrow{p(t)} - \frac{\overrightarrow{P[6]}}{\overrightarrow{P[8]} - \overrightarrow{P[6]}} \cdot \overrightarrow{\Delta p(\Delta T_s)} \quad [1]$$

The workpiece(s) 25 can be moving at a constant speed as on a conveyor. The workpiece 25 can move at a random speed, as occurs at a loose end of a malleable or flexible part. A number of filtering techniques can be applied to the sensor data streams, such as Kalman filtering, to predict subsequent sensor data streams permitting implementation of more advanced predictive robot local motion interpolation for better smoothing between the sensor data streams. The sensor data streams can each comprise a relative position between the EOAT 15 and the position of the workpiece 25.

The sensor data streams iteratively describe updated, present positions of the workpiece 25 at the local motion interpolation level of the robotic arm 10 to allow the inputs from the locating sensing devices 30, 40 to be dynamically incorporated in the commanded movement of the robotic arm 10. The iteratively generated sensor data streams guide movement of the robotic arm 10 relative to the malleable workpiece 25 when the sensor data stream $\overrightarrow{\Delta p(t)}$ is time-dependent. The dynamic manner of using the sensor data stream comprises using sensor signals at a time interval $\overrightarrow{\Delta T_s}$ that is applied at the system level without interaction from an operator. The operator commands operation to activate the locating sensing devices 30, 40. Then, locating sensing devices 30, 40 can guide the robotic arm 10 at the sensor data stream rate blended with the motion rate of the robotic arm 10 to achieve interpolated local motion of the robotic arm 10. As a result, movement of the robotic arm 10 along a preferred path can be dynamically adjusted to an updated position vector of the workpiece 25 based upon the monitored position of the workpiece 25 using sensor data streaming from the plurality of locating sensing devices 30, 40.

In an embodiment wherein the locating sensing devices 30 is fixed relative to the base 20, the workpiece(s) 25 can be malleable or moving relative to the spatial three-dimensional coordinate system 200. The locating sensing devices 30, 40 continuously monitor position of the workpiece 25 and outputs the sensor data stream comprising the position of the workpiece 25, incremented over elapsed time. The control module 5 and robotic arm 10 use the sensor data streams as inputs and apply them to its local motion interpolation to dynamically adjust final position of the EOAT 15 to be contiguous to the workpiece 25, thus permitting the EOAT 15 to engage the workpiece 25.

In an embodiment wherein the locating sensing devices 30 is mounted on the robotic arm 10, the workpiece(s) 25 can be static and rigid. The sensors are continuously sensing the position of the workpiece 25 with respect to time and generate the sensor data stream relative to the spatial three-dimensional coordinate system 200. This increases accuracy and resolution of position of workpiece(s) 25 when the EOAT 15 is approaching the workpiece(s) 25 for engagement, e.g., for pickup or assembly.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for maneuvering an articulable robotic arm having an end-of-arm tool, comprising:
    monitoring a position of a moving workpiece;
    determining an initial position of the moving workpiece;
    determining an initial position of the end-of-arm tool;
    iteratively determining an updated position of the moving workpiece corresponding to the monitored position of the moving workpiece; and
    while the moving workpiece is not engaged to the end-of-arm tool, iteratively executing individual motion segments to control the articulable robotic arm to position the end-of-arm tool contiguous to the moving workpiece until the end-of-arm tool engages the moving workpiece at the iteratively determined updated position of the moving workpiece based upon the initial position of the end-of-arm tool and the initial position of the moving workpiece.

2. The method of claim 1, wherein monitoring the position of the moving workpiece is effected utilizing a sensor device attached to the articulable robotic arm, the method further comprising:
    generating a sensor data stream corresponding to the updated position of the moving workpiece after an elapsed time period; and
    executing the individual motion segments to control the articulable robotic arm responsive to the sensor data stream corresponding to the updated position of the moving workpiece after the elapsed time period.

3. The method of claim 1, further comprising:
    defining a first trajectory corresponding to a difference between the initial position of the end-of-arm tool and the initial position of the moving workpiece;
    wherein iteratively executing the individual motion segments to control the articulable robotic arm is based upon the first trajectory.

4. The method of claim 3, further comprising:
    wherein iteratively determining the updated position of the moving workpiece occurs after an elapsed time period;
    determining a correction vector corresponding to the updated position of the moving workpiece and an updated position of the end-of-arm tool; and
    wherein individual motion segments to control the articulable robotic arm are adjusted by the correction vector.

5. The method of claim 3, further comprising:
    wherein iteratively determining the updated position of the moving workpiece occurs after an elapsed time period;

determining a plurality of correction vectors corresponding to a plurality of updated positions of the moving workpiece and an updated position of the end-of-arm tool; and wherein individual motion segments to control the articulable robotic arm correspond to the first trajectory adjusted by the plurality of correction vectors.

6. A method for maneuvering an articulable robotic arm signally connected to a three-dimensional position sensing device, the robotic arm having an end-of-arm tool operable to interact with a malleable workpiece, the method comprising:

monitoring a position of the malleable workpiece with the three-dimensional position sensing device and iteratively generating sensor data streams, each sensor data stream corresponding to a position of the malleable workpiece updated after an elapsed time period;

determining an initial position of the end-of-arm tool of the articulable robotic arm;

defining a first trajectory corresponding to a spatial difference between the initial position of the end-of-arm tool and the initial position of the malleable workpiece; and while the malleable workpiece is not engaged to the end-of-arm tool, iteratively executing individual motion segments to control the articulable robotic arm to position the end-of-arm tool contiguous to the malleable workpiece until the end-of-arm tool engages the malleable workpiece at an updated position of the moving workpiece and responsive to the first trajectory.

7. The method of claim 6, further comprising:

determining a correction vector corresponding to the updated position of the malleable workpiece and an updated position of the end-of-arm tool; and executing the individual motion segments to move the articulable robotic arm responsive to the first trajectory adjusted by the correction vector.

8. The method of claim 7, further comprising:

iteratively updating the position of the malleable workpiece corresponding to the sensor data stream generated after a plurality of elapsed time periods;

determining a plurality of correction vectors corresponding to the updated position of the malleable workpiece after the elapsed time periods and an updated position of the end-of-arm tool; and iteratively executing the individual motion segments to move the articulable robotic arm, said individual motion segments corresponding to the first trajectory adjusted by the plurality of correction vectors.

9. A method for maneuvering an articulable robotic arm having an end-of-arm tool and signally connected to a three-dimensional position sensing device configured to monitor position of a moving workpiece and generate a sensor data stream, comprising:

determining a first position of the moving workpiece and determining a first position of the end-of-arm tool of the articulable robotic arm;

iteratively generating an updated sensor data stream corresponding to an updated position of the moving workpiece after an elapsed time period;

iteratively determining a correction to the first position of the moving workpiece associated with the updated sensor data stream corresponding to the updated position of the moving workpiece after the elapsed time period; and while the moving workpiece is not engaged to the end-of-arm tool, iteratively executing individual robotic motion segments to position the end-of-arm tool contiguous to the moving workpiece until the end-of-arm tool engages the moving workpiece at the updated position of the moving workpiece, said robotic motion segments responsive to the first position of the end-of-arm tool and the first position of the moving workpiece.

10. The method of claim 9, further comprising:

defining a first trajectory corresponding to a difference between the initial position of the end-of-arm tool and the initial position of the moving workpiece, and iteratively executing the individual robotic motion segments to position the articulable robotic arm responsive to the first trajectory.

11. The method of claim 10, further comprising:

determining a correction vector corresponding to the updated position of the moving workpiece and an updated position of the end-of-arm tool; and iteratively executing the individual robotic motion segments to position the articulable robotic arm responsive to the first trajectory and the correction vector.

12. The method of claim 11, further comprising interpolating the position of the end-of-arm tool during each of the individual robotic motion segments to determine the updated position of the end-of-arm tool.

* * * * *